3,109,847
OXAZOLINE MODIFIED CLAY
Richard G. Shaler, Jr., San Rafael, and Raymond L. McAdam and Richard G. Shaler, San Anselmo, Calif., assignors to The Inerto Company, Las Vegas, Nev., a limited partnership of California
No Drawing. Filed Apr. 7, 1961, Ser. No. 101,343
8 Claims. (Cl. 260—299)

This invention relates to clays that have been modified to make them organophilic. More particularly, it relates to clays of the cation exchange type that have been modified with certain oxazoline derived cations to render the clays organophilic and hydrophobic.

The primary object of the present invention is to provide compositions containing cation exchangeable clays that exhibit organophilic properties. A further object is to provide clays of the foregoing description that are swellable in benzene as well as in other conformable organic liquids known in the art. Further objects, features, and advantages will become apparent upon reading the following detailed description of the invention.

Numerous workers have taught that certain colloidal clays such as bentonites when placed in water swell to many times their dry volumes and thereby form gels. It is further shown that the clays may be modified to further improve the aqueous swelling materials so that they do not dry and shrink by reason of evaporation of the liquid phase. Other investigators have taught that these colloidal clays per se or suitably modified had no substantial gel forming characteristics in organic liquids and were substantially nonswelling. Thus, the additional need for organophilic clays was clear.

To this end it has been proposed to modify the clays with various organic compounds so that clays would become swellable in organic liquids in much the same way that they were swellable in aqueous solutions.

Regardless of the characteristic of the clay, that is, whether it is hydrophilic or organophilic, it is generally employed for its thixotropic properties and ability to impart them to the medium in which it is dispersed. There are numerous products in which it is desirable to alter the thixotropy, i.e. the phenomenon of becoming fluid on shaking and coagulating when left at rest, and which are essentially organic mediums. Hydrophilic clays are not suitable and organophilic clays are a necessity. Examples of such porducts which require organophilic clay are organic solvent type paints, foundry binding material in which it is desired to exclude all water from the casting where it is used, and the like.

The function of the clay in the case of a paint formulation for example, is to thicken and control the viscosity of the paint and act as a suspending agent. If untreated clay, or clay that has been treated to improve its properties in aqueous solution, is added to organic products such as paint, an undesirable and unsuitable product is obtained. The clay would not be tolerated by the organic medium or system and no gel between the clay and the solution would be produced. Therefore, the thixotropy of the solution is not effected substantially and the object of adding the clay is not achieved.

While a number of ways of obtaining organophilic clays have been discovered and the end products disclosed, all of the prior products had at least one serious deficiency. These prior organophilic clays would not form a homogeneous gel with benzene unless the clay was first treated with toluene and then mixed with the benzene. If it was desired to swell the clay directly with benzene, it could only be accomplished after great efforts such as grinding the clay in a colloid mill.

An organophilic composition has now been discovered that is readily swellable in benzene directly without resorting to the time consuming and uneconomical steps required of the prior art compositions. The compositions of the present invention are of course also swellable in all of the organic solvents that were suitable for use in the prior art compositions. Accordingly, the present invention provides a composition comprising a cation exchangeable clay containing an acid derived aliphatic substituted oxazoline cation.

While any acid derived aliphatic substituted oxazoline cation may suitably be combined with the clay, certain substituted oxazolines are advantageously used. Best results have been found where the oxazoline ring is substituted with an aliphatic hydrocarbon having a straight chain of at least 8 carbon atoms. If substantially less than 8 carbon atoms are present, the organophilic properties of the final product tend to be impaired. On the other hand, the upper limit is set by practical considerations of availability and cost. For practical purposes, hydrocarbons having chains of from about 8–30 carbon atoms are suitable.

The chain may be saturated or unsaturated such as found in alkyl chains or alkenyl chains of the mono- and polyunsaturated types. Suitably, the chain may have other hydrocarbon groups substituted thereon to make it a branched chain so long as there is at least one straight chain of the requisite number of carbon atoms present. It is also possible to have other types of substituents on the chain such as halogen atoms or hydroxy groups.

Besides the aliphatic chain of at least 8 hydrocarbons, the oxazoline ring may have additional substituents on the same or other carbon atoms in the ring. Thus, additional substituents on the ring such as hydrocarbon radicals like the alkyl or alkenyl radicals and the hydroxy substitution products thereof may suitably be present.

In other words, it is preferred that the selected clay contain a cation represented by the structural formula:

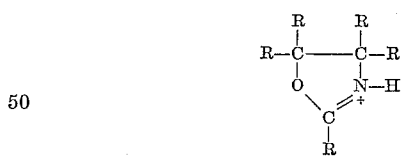

wherein each R is selected from the group consisting of the alkyl and alkenyl radicals and the hydroxy substitution products thereof and the hydrogen atom, providing at least one R is other than a hydrogen atom and has a straight chain of at least 8 carbon atoms.

While the preferred cations include the 2-oxazolines described above, corresponding cations containing the corresponding 3-oxazoline isomers are also contemplated within the scope of the present invention.

Most preferably, the carbon atom between the oxygen and nitrogen atoms contains the straight chain of at least 8 carbon atoms, and the other two carbon atoms have the remaining substituents, if any, on the ring. If present, it is preferred that the remaining substituents on the other two carbon atoms are alkyl and/or hydroxyalkyl radicals of up to about 30 carbon atoms.

It has been found that best results are achieved if other substituents are present and that the substituent or substituents on these other two carbon atoms include at least one alkyl group.

Thus, the invention includes as typical examples among others, a cation exchangeable clay containing the cation of an acid salt of a compound selected from the following:

2-heptadecenyl-4,4-dimethyl-2-oxazoline
2-heptadecenyl-4-methyl-4-hydroxymethyl-2-oxazoline
2-octenyl-4,4-dimethyl-2-oxazoline
2-decanyl-4,4-diethyl-2-oxazoline
2-(5-methylpentadecanyl)-4-methyl-4-hydroxyethyl-2-oxazoline
2-tetracosenyl-4,4-dimethyl-2-oxazoline
2-heptadecanyl-4-propyl-4-hydroxymethyl-2-oxazoline
2-triacontanyl-4-methyl-4-hydroxybutyl-2-oxazoline
2-eicosenyl-4-ethyl-4-hydroxyethyl-2-oxazoline
2-tetradecanyl-2-butyl-4-hydroxymethyl-2-oxazoline The clays which are present in the present compositions are those exhibiting cation exchange properties. Preferably, the clays are those which exhibit comparatively high exchange properties and which have cations capable of relatively easy replacement. The list which follows gives typical natural and synthetic clays which are suitable in the present compositions.

CATION-EXCHANGEABLE INORGANIC COLLOIDS

A. Natural clays:
    Bentonites
        Wyoming bentonite
        Montmorillonites—hectorite
    Beidellite
    Saponite
    Nontronite
    Sepiolite
    Biotite
    Attapulgite
    Vermiculite
    Zeolites
        Edingtonite
        Chabazite
        Natrolite
        Mordenites B. Synthetic clays:
    Magnesia-silica-sodium oxide
    Lime-silica-potassium oxide
    Baria-silica-lithium oxide C. Synthetic zeolites:
    Complex aluminum silicates—
        Exchangeable cation:
            Hydrogen
            Sodium
            Potassium
            Barium
            Magnesium
            Ammonium The clays preferably to be incorporated in the present invention are the montmorillonites and most preferably is the member of that group known as hectorite. The montmorillonites, and in particular hectorite, have comparatively high base-exchange capacity on the order of 60–100. Base exchange capacity of the clays in general run from about 15 to about 100. This figure is based upon milliequivalents of exchangeable base per 100 grams of clay.

These clays are characterized by an unbalanced atomic structure or unbalanced crystal lattice and are believed to have negative charges which are normally neutralized by inorganic cations. As found in nature, they exist as salts of the weak clay-acid with basis such as the alkali- or alkaline-earth metal hydroxides. The alkali- or alkaline-earth metal cation present for example, may be exchanged and replaced with the acid derived cation of an oxazoline of the present invention.

The compositions are made by combining the desired clay and the desired oxazoline cation by any suitable method. Broadly, one suitable approach is to replace the cations of the clay with the desired cation by ion exchange. This may be accomplished by intermixing in an aqueous medium the desired clay and the desired oxazoline in the presence of an acid.

Any organic or inorganic acid capable of forming a salt with the oxazoline may be used. Relatively strong organic acids such as the sulphonic acids as well as such acids like acetic, or oxalic may be used. Preferably, a strong inorganic acid such as sulphuric or hydrochloric is employed for this purpose.

The exchange is conveniently carried out using conventional ion exchange techniques and is conducted in aqueous solutions at atmospheric pressure and room temperature. Pressure and temperature conditions, of course, are not restricted and may be varied with appropriate modifications as will be understood by those skilled in the art.

While it is preferred to acidify the selected oxazoline first and then combine it with the clay, any other order of combination may be used. Upon intermixing the selected oxazoline and clay in acid, water is expelled from the clay. The expelled water is the water of hydration of the clay. At this point the clay has been rendered organophilic and is hydrophobic.

The explusion of the water of hydration may be accelerated by a number of techniques. The water can be filtered as it is expelled, or the excess water may be filtered and the material washed with additional distilled water. Preferably, a suitable organic solvent such as benzene may be added to the reaction mixture and thereby most rapidly expel the water. All three of these techniques were alternatively employed in the example to be described hereinafter. In any event, it is usually desirable to dry the product such as by air drying before using it for its intended purpose in an organic medium.

The amount of acid added to the reaction mixture should be at least enough for salt formation of all of the oxazoline present. In other words, the acid should be present in at least an equivalent amount with respect to the oxazoline. If less than that amount is used, part of the oxazoline will remain unreacted and will not be exchangeable with the cations of the clay.

The oxazoline is preferably employed in at least an amount equivalent to the exchange capacity of the clay. Thus, if 100 grams of hectorite having an exchange capacity of 100 milliequivalents is employed, an amount of an oxazoline that may be converted to at least 100 equivalents of salt is preferably employed. If less than this amount is employed, part of the clay will remain in its original state. Greater amounts may accelerate the ion exchange reaction rate up to the use of a moderate excess, beyond which the excess will merely remain unused.

The following example will best illustrate the details of preparation of the compositions of the present invention and will also demonstrate their properties.

*Example*

The cation exchange clay employed was purified hectorite having an exchange capacity of 100 (100 milliequivalents per 100 grams). The 2-substituted oxazolines that were employed will be designated A and B for simplicity where A is 2-heptadecenyl-4,4-dimethyl-2-oxazoline and B is 2-heptadecenyl-4-methyl-4-hydroxymethyl-2-oxazoline. Modified clays were made from the above materials by the following four variations of an ion exchange method:

(1) Compounds A and B were titrated to pH 5 with

HCl. 9 mls. of A required 7.5 mls. of 2 N HCl and 9 mls. of B required 7.5 mls. of 2 N HCl. The acidified product in each case was then added to a 500 ml. aqueous slurry containing 25 grams of dry purified hectorite.

(2) Equivalent quantities of A and B were mixed with a 500 ml. aqueous slurry of 25 grams of dry purified hectorite. This required 9 mls. of A and 9 mls. of B to equal the 25 milliequivalent exchange capacity of the hectorite used. When thoroughly mixed, 100 milliequivalents of HCl was added to each sample to complete the modification of the clay.

(3) 25 gram samples of clay were converted to H+ form by treating with excess quantities of dilute aqueous HCl. To each slurry equivalent amounts of A (9 mls.) and B (9 mls.) were added.

Using any of the above three procedures, modified clays containing mixtures of different oxazolines are made by using two or more different oxazolines in an amount whose total equivalents were about equal to the exchange capacity of the clay.

The reaction mixtures of the above three methods were divided into three portions each, and their processing completed by one of the following three procedures. Each of the three portions resulting from the same starting mixture was processed by a different procedure than the other two portions to provide nine samples.

(1) Water which was expelled during the reaction was filtered off.

(2) Water expelled during the reaction was filtered off and the material was then washed with distilled water.

(3) Benzene was added to the reaction mixture. Rapid and complete expulsion of water was observed when this procedure was followed.

The samples obtained from all of the procedures were then air dried and employed in the following series of tests to demonstrate their organophilic properties. 5 grams of each of the nine samples were mixed with 25 mls. of each of the following solvents:

(1) Benzene
(2) Toluene
(3) Gasoline
(4) Naphtha

In all cases, including the tests made with benzene, a very suitable and satisfactory gel was obtained exhibiting desirable thixotropy. The gels produced from the samples prepared by the procedure where benzene was added to the reaction mixture gave the most desirable gels, although all of the gels obtained were satisfactory.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A composition consisting essentially of hectorite containing the cation of a salt of 2-heptadecenyl-4,4-dimethyl-2-oxazoline in an amount substantially equivalent to the exchange capacity of the hectorite.

2. A composition consisting essentially of hectorite containing the cation of an acid salt of 2-heptadecenyl-4-methyl-4-hydroxymethyl-2-oxazoline in an amount substantially equivalent to the exchange capacity of the hectorite.

3. An organophilic composition consisting essentially of a montmorillonite clay and a cation of the formula:

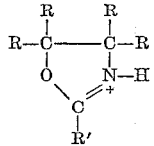

wherein each R is lower alkyl and R' is a straight chain hydrocarbon of at least 8 carbon atoms, said cation being present in an amount sufficient to render the composition organophilic.

4. A composition in accordance with claim 3 wherein the montmorillonite clay is hectorite.

5. An organophilic composition consisting essentially of a montmorillonite clay and a cation of the formula:

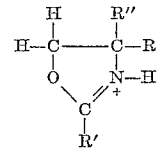

wherein R is monohydroxy lower alkyl, R'' is lower alkyl, and R' is a straight chain hydrocarbon of at least 8 carbon atoms, said cation being present in an amount substantially equivalent to the exchange capacity of the clay.

6. An organophilic composition consisting essentially of a montmorillonite clay and a cation of the formula:

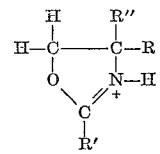

wherein R is monohydroxy lower alkyl, R'' is lower alkyl, and R' is a straight chain hydrocarbon of at least 8 carbon atoms, said cation being present in an amount sufficient to render the composition organophilic.

7. An organophilic composition consisting essentially of a cation exchangeable inorganic colloid selected from the group consisting of natural clays, synthetic clays, and synthetic zeolites, said colloid containing a cation of the formula:

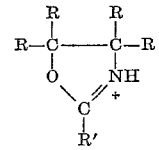

wherein each R is a radical selected from the group consisting of hydrogen, lower alkyl, lower alkenyl, and monohydroxy lower alkyl and R' is a straight chain hydrocarbon of at least 8 carbon atoms, said cation being present in an amount sufficient to render the composition organophilic.

8. An organophilic composition consisting essentially of a cation exchangeable inorganic colloid selected from the group consisting of natural clays, synthetic clays, and synthetic zeolites, said colloid containing a cation of the formula:

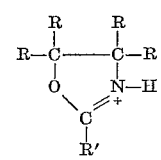

wherein each R is a radical selected from the group consisting of hydrogen, lower alkyl, lower alkenyl, and monohydroxy lower alkyl and R' is a straight chain hydrocarbon of at least 8 carbon atoms, said cation being present in an amount substantially equivalent to the exchange capacity of the clay.

References Cited in the file of this patent
UNITED STATES PATENTS 2,767,177    Erickson _____ Oct. 16, 1956